United States Patent
Moinard et al.

Patent Number: 5,226,694
Date of Patent: Jul. 13, 1993

[54] HYDRAULICALLY CONTROLLED BRAKE SYSTEM AND ASSOCIATED CORRECTOR

[75] Inventors: Patrice Moinard, Montreuil; Philippe Castel, Paris; Jean-Michel Pichon, Messy, all of France

[73] Assignee: Bendix Europe Services Techniques, Drancy, France

[21] Appl. No.: 717,557

[22] Filed: Jun. 19, 1991

[30] Foreign Application Priority Data

Jun. 20, 1990 [FR] France ............... 90 07696

[51] Int. Cl.⁵ .................................... B60T 8/26
[52] U.S. Cl. ..................... 303/92; 303/9.63; 303/113.5
[58] Field of Search ............. 303/9.63, 92, 113 AP, 303/9.62, 9.73, 9.69, 9.72, 9.75, 91, 113 R, 9.74, 9.76, 119 SV

[56] References Cited

U.S. PATENT DOCUMENTS

| | | | |
|---|---|---|---|
| 3,862,781 | 1/1975 | King et al. | 303/9.69 |
| 3,941,427 | 3/1976 | Harries | 303/92 |
| 4,121,872 | 10/1978 | Burgdorf et al. | 303/9.72 |
| 4,647,114 | 3/1987 | Schuett et al. | 303/92 |
| 4,714,296 | 12/1987 | Imoto et al. | 303/9.69 X |
| 4,805,967 | 2/1989 | Arikawa | 303/92 X |
| 4,812,777 | 3/1989 | Shirai | 303/9.62 X |
| 4,840,434 | 6/1989 | Leiber | 303/9.71 X |
| 4,890,890 | 1/1990 | Leiber | 303/9.71 X |
| 4,943,123 | 7/1990 | Takeda et al. | 303/9.62 X |
| 4,982,999 | 1/1991 | Rossigno et al. | 303/9.63 |
| 5,118,164 | 6/1992 | Rossigno et al. | 303/9.63 |

FOREIGN PATENT DOCUMENTS

| | | | |
|---|---|---|---|
| 368359 | 5/1990 | European Pat. Off. | |
| 3419311 | 11/1985 | Fed. Rep. of Germany | |
| 3440541 | 5/1986 | Fed. Rep. of Germany | 303/9.63 |
| 2569382 | 2/1986 | France | |
| 2571326 | 1/1988 | France | |
| 2624462 | 6/1989 | France | |
| 37565 | 2/1986 | Japan | 303/9.69 |
| 95959 | 4/1989 | Japan | 303/113 AP |
| 95960 | 4/1989 | Japan | 303/9.62 |
| 9011917 | 10/1990 | PCT Int'l Appl. | 303/9.71 |
| 1390947 | 4/1975 | United Kingdom | 303/113 AP |
| 2188112 | 9/1987 | United Kingdom | |
| 2213543 | 8/1989 | United Kingdom | 303/113 AP |
| 2238361 | 5/1991 | United Kingdom | 303/113 AP |

*Primary Examiner*—Robert J. Oberleitner
*Assistant Examiner*—Alfred Muratori
*Attorney, Agent, or Firm*—Larry J. Palguta; Ken C. Decker

[57] ABSTRACT

A hydraulically controlled brake system for a motor vehicle, comprising a master cylinder, a corrector intended for reducing the pressure prevailing in the rear-wheel brakes in relation to that prevailing in the front wheels, and a wheel anti-lock device. The corrector is of the type with a controlled shift of the cut-off point. During the operation of the anti-lock device, the cut-off point has a specific value higher than that of a corrector equipping the vehicle without a wheel anti-lock device, while it is substantially equal to the latter in the event of a failure of the device.

12 Claims, 3 Drawing Sheets

HYDRAULICALLY CONTROLLED BRAKE SYSTEM AND ASSOCIATED CORRECTOR

BACKGROUND OF THE INVENTION

The present invention relates to hydraulically controlled brake systems for motor vehicles, comprising a master cylinder, a corrector intended for reducing the pressure prevailing in the rear-wheel brakes in relation to that prevailing in the front-wheel brakes, and a wheel anti-lock device.

Such systems are known to an average person skilled in the art. The document FR-B-2,550,747 describes, for example, such a system in which the corrector is inactivated when the wheel anti-lock device comes into operation and takes over the control of the brake circuit. However, this inactivation of the corrector is accompanied by an abrupt increase of pressure in the rear-wheel brakes before the anti-lock device can act correctly. This abrupt increase is utterly detrimental to braking under good conditions of safety and comfort.

To overcome this problem, the document FR-A-2,624,462 proposes normally to short-circuit the corrector as soon as the vehicle so equipped is moving, a maximum pressure being applied to the rear-wheel brakes and being modulated by the anti-lock device, and to activate the corrector only in the event of a failure of the anti-lock device.

The document FR-A-2,571,326 provides an alternative version of this solution, according to which the corrector is inhibited completely during normal operation. However, this simply means that the anti-lock device is operated very frequently as soon as the vehicle has to brake. Now an anti-lock device is a fragile element, the lifetime of which is reduced by over-frequent operation, its components being subjected to premature wear.

SUMMARY OF THE INVENTION

The object of the present invention is to overcome these disadvantages by using a corrector operating permanently in order to reduce the pressure in the rear-wheel brakes, the active pressure nevertheless being modified in the event of a failure of the anti-lock device, in order to ensure maximum safety without detriment to comfort.

According to the invention, therefore, the corrector is of the type with a controlled shift of the cut-off point, during the operation of the anti-lock device the cut-off point having a specific value higher than that of a corrector equipping a vehicle without a wheel anti-lock device, while it is substantially equal to the latter in the event of a failure of the anti-lock system.

The anti-lock device is thus used only a little as a corrector. The lifetime of the device is thereby protected and there is maximum braking safety.

The invention also relates to a corrector of the above-mentioned type.

BRIEF DESCRIPTION OF THE DRAWINGS

The invention will now be described by way of example with reference to the accompanying drawings in which.

DETAILED DESCRIPTION OF THE INVENTION

Figure 1:
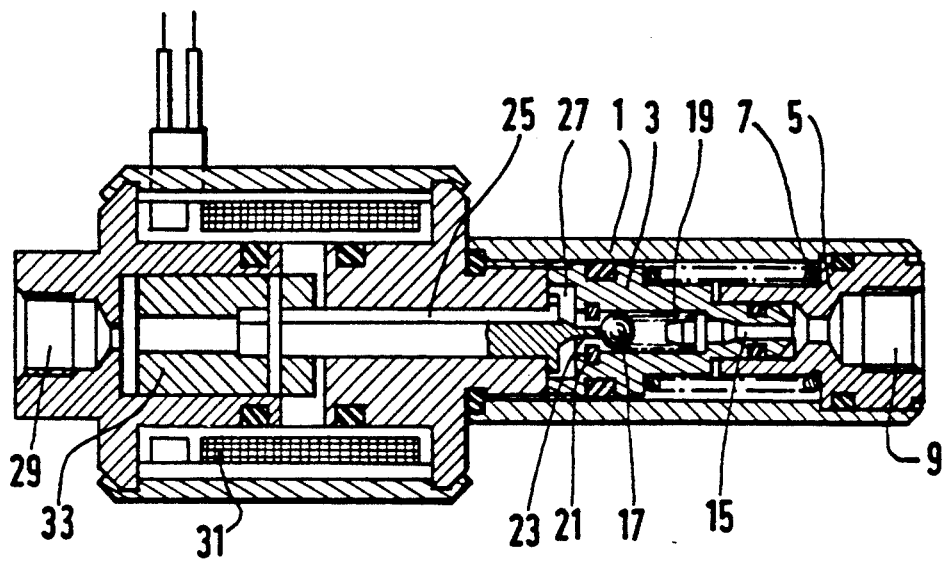
FIGS. 1 and 2 illustrate diagrammatically two embodiments of an electrically controlled corrector according to the invention.

Referring now to FIG. 1, the corrector consists of a body 1 in which a bore has been made. A stepped piston 3 slides in this bore. A plug 5 closing the bore has itself a bore in which the part of smaller diameter of the stepped piston 3 slides. A spring 7 keeps the piston 3 and the plug 5 away from one another.

The inlet 9 formed by an orifice made in the plug 5 is connected to an outlet of the master cylinder (not shown). The piston 3 has an inner channel 15 connecting its two faces. Arranged in this channel 15 is a ball 17 forming a shutter, returned by a spring 19 onto a seat 21 integral with the piston 3.

A needle 23 integral with a pusher 25 is capable of opening the shutter 17 by pushing on the latter.

The chamber 27 confronting the face of larger diameter of the piston 3 is connected to the corrector outlet 29 which is connected to at least one rear-wheel brake motor.

A solenoid 31 connected to an electrical current source is capable of moving a magnetic core 33 integral with the pusher 25.

Figure 4:
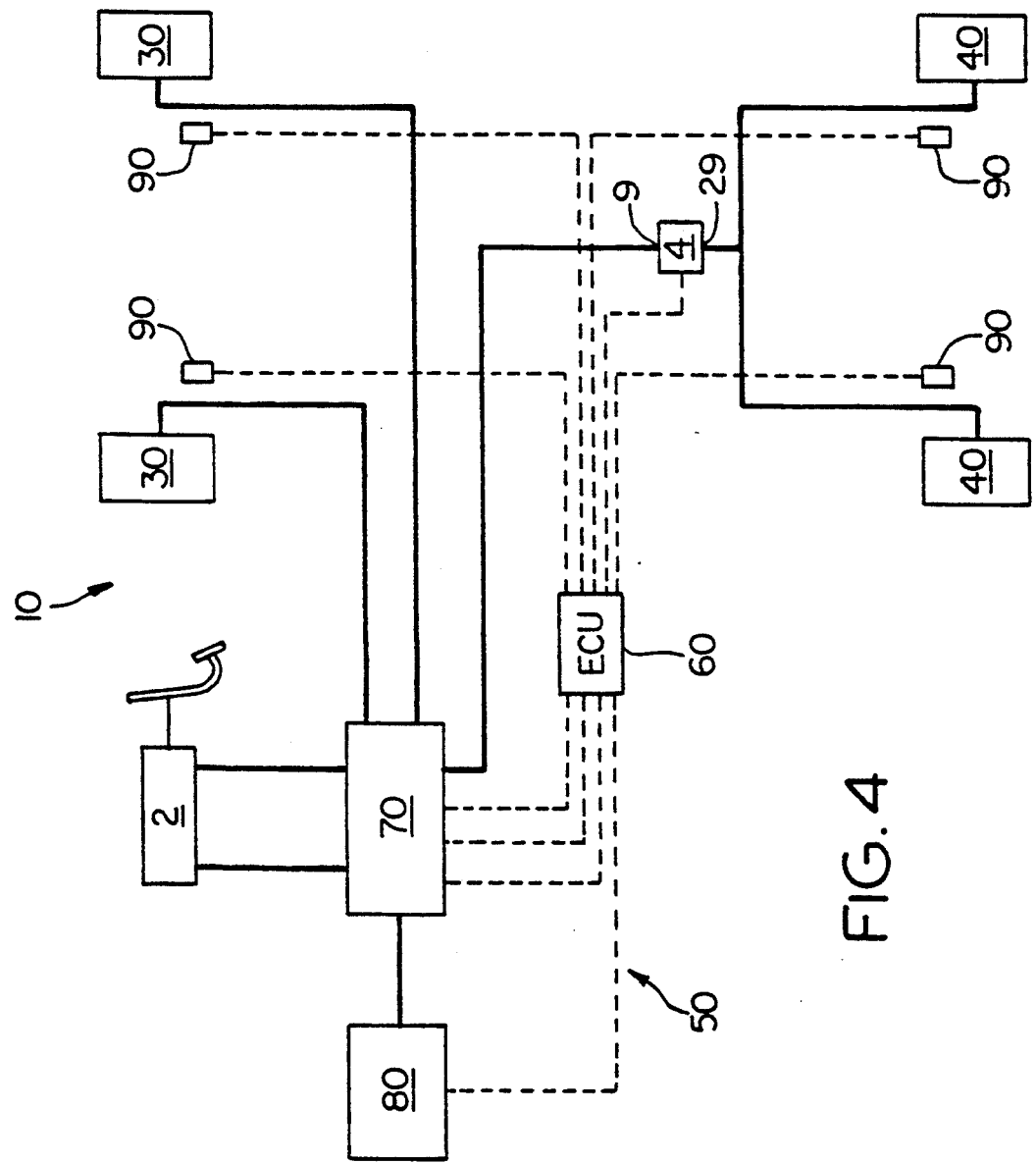
FIG. 4 is a schematic illustration of a brake system with an anti-lock device.

FIG. 4 illustrates schematically a braking system 10 with a master cylinder 2, a corrector 4 as illustrated in FIG. 1, front wheel brakes 30, rear wheel brakes 40, and a typical anti-lock device designated generally by reference numeral 50 and comprising an electronic control unit 60 (ECU), modulator mechanism 70, a source of fluid under high pressure 80, and wheel speed sensors 90.

During the normal operation of the complete brake system or only during the normal operation of the anti-lock device, that is to say when there is no failure of the associated wheel anti-lock device, the solenoid 31 of FIG. 1 is energized, thereby causing a movement, to the right in FIG. 1, of the assembly consisting of the core 33, of the pusher 25 and of the needle 23 which tends to push the shutter 17 further away from its seat.

During braking, a fluid under pressure is applied to the inlet 9 of the corrector and is propagated via the channel 15 into the chamber 27 and the outlet 29, since the shutter is then open. The increase in pressure tends to cause the piston 3 to slide towards the right in FIG. 1, counter to the spring 7, in order to close the communication shutter. The shutter in fact closes when the effect of the pressure in the chamber 27 balances the twin effects of the spring 7 and of the pressure at the inlet 9.

This is therefore a corrector which functions in the conventional way.

In the example illustrated, the cut-off point of the corrector, determined by the first closing of the shutter, can be adjusted by screwing the plug 5 which is therefore threaded and which interacts with a corresponding internal thread in the bore. The effect of such a screwing or unscrewing is to change the prestress of the spring 7 opposing the closing of the shutter.

The cut-off point can also be adjusted as a function of the load supported by the rear wheels of the vehicle, by substituting for the plug shown a piston controlled by this load.

In the event of failure of the anti-lock device or in the event of failure of an element of the electrical circuit, the solenoid 31 is de-energized, the effect of this being to return the assembly consisting of the core 33, the pusher 25 and the needle 23 towards the left in FIG. 1 as a result of the action of the shutter spring 19 or of an auxiliary spring (not shown). The shutter 17 then approaches its seat 21, thereby reducing the stroke of the piston 3 necessary for closing the shutter and consequently the corresponding load of the spring 7, thereby returning the abovementioned cut-off point to a level below the preceding level.

Figure 2:
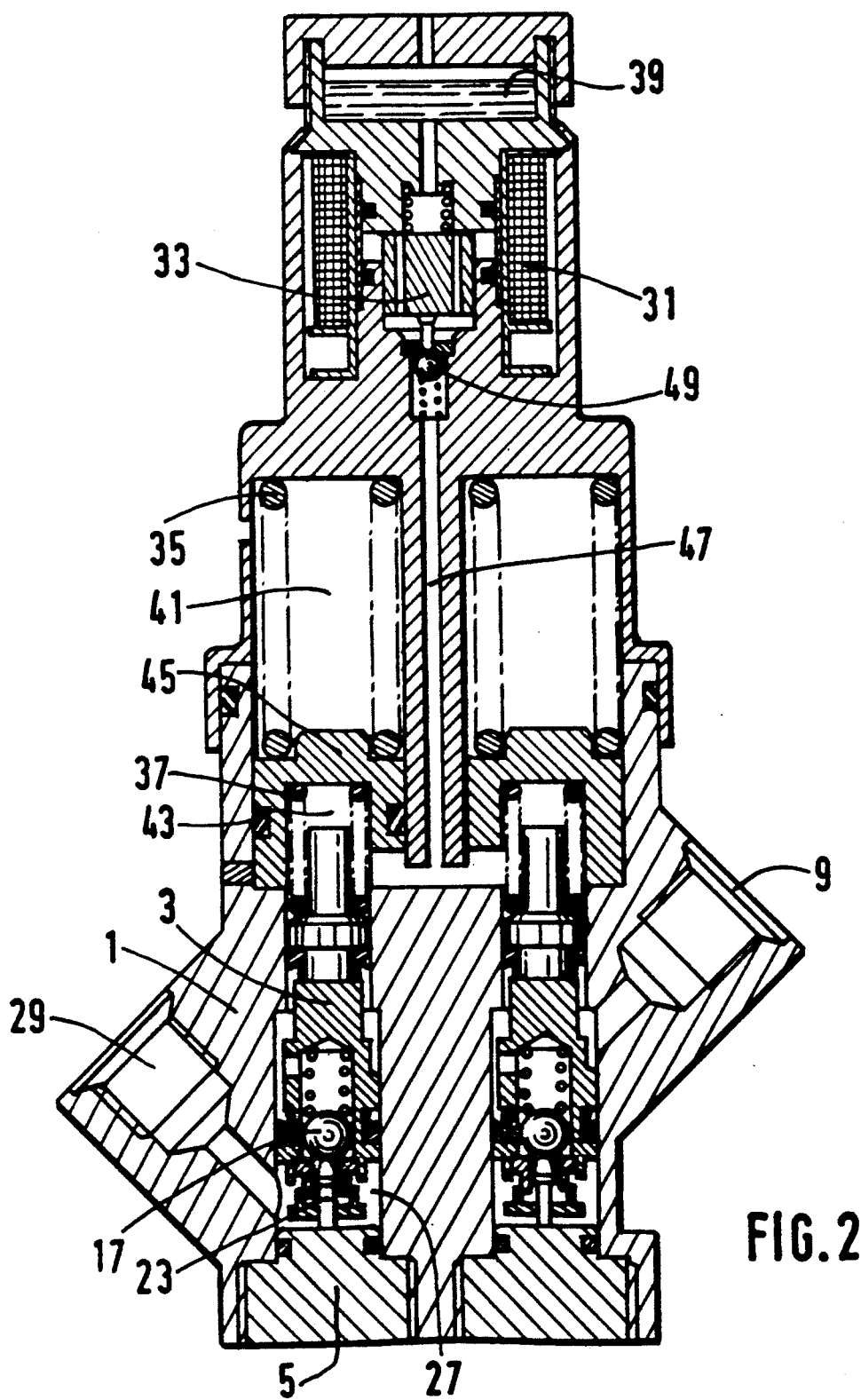

FIG. 2 illustrates a double corrector, although the embodiment can also apply to a single corrector. The two cut-off points are each defined, here, by the prestress applied to a respective spring 35, 37.

The two springs are arranged in series and are each enclosed in a respective variable-volume chamber 41, 43. Between these two chambers, a piston 45 serves as a support for the springs and ensures that one chamber is isolated from the other.

In the example illustrated, the spring 37 has a lower prestress than that of the spring 35.

A conduit 47 made in the body 1 connects the chamber 43, in which the spring 37 of lower load in place is enclosed, to a reservoir 39 of incompressible fluid by means of a solenoid valve which consists, here, of a solenoid 31 controlling a core 33 opening or closing a shutter 49.

Thus, during the normal operation of the complete brake system or only during the normal operation of the anti-lock device, the solenoid 31 is energized and the shutter 49 is closed, thus isolating the chamber 43 which then constitutes a hydraulic wall. Consequently, the prestress of the spring 35 defines the cut-off point of the corrector, that is to say a high cut-off point.

In the event of failure, the solenoid 31 is deenergized and the shutter 49 opens. It is then the lower prestress of the spring 37 which defines the new cut-off point, that is to say a low cut-off point.

A corrector with two separate cut-off points and of the controlled-shift type is thus obtained.

Preferably, the cut-off point selected when there is no failure of the anti-lock device is in the neighborhood of that required when the vehicle is under full load. In the event of failure of the anti-lock device or in the event of failure of an element of the electrical circuit, the cut-off point selected is that which would have been selected if the vehicle were not equipped with such an anti-lock device and corresponds substantially to that required for the vehicle under no load. The change from one cut-off point to the other thus ensures perfect braking safety, whatever the state of the anti-lock device.

Figure 3:
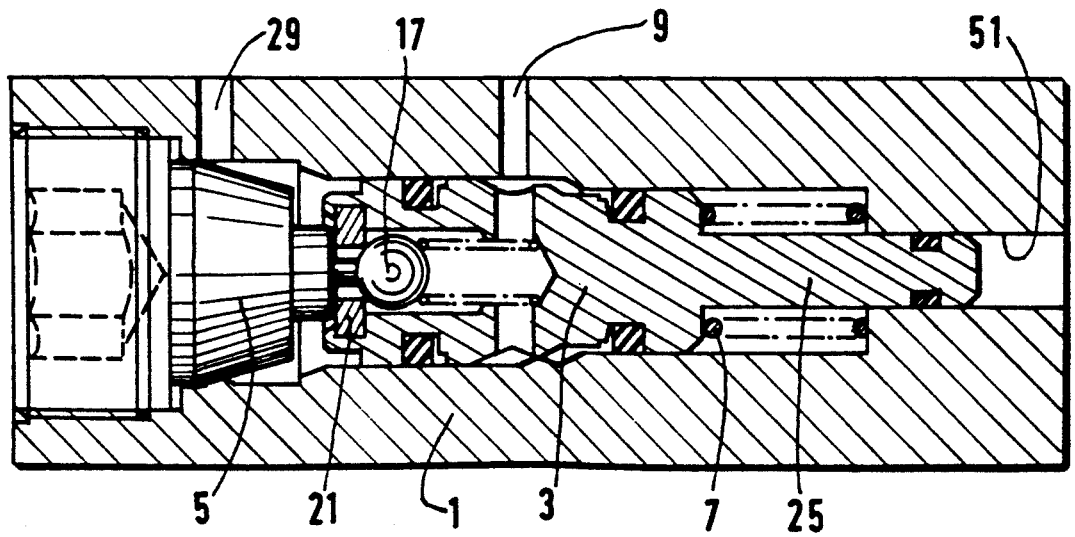
FIG. 3 shows diagrammatically an embodiment of a hydraulically controlled corrector according to the invention.

FIG. 3 illustrates a corrector of the same type, but controlled hydraulically, thus making it possible to avoid using an additional solenoid. In this FIG. 3, the same elements as those described previously bear the same references.

Here, the stepped piston 3 is integral with the pusher 25. This pusher 25 slides sealingly in a stepped part 51 of the bore made in the body 1. Applied to the end of this pusher 25 is the fluid under high pressure delivered by the source associated with the anti-lock device.

This source is generally a conventional pump feeding the brake motors with suitable fluid. Thus, when the pump of the anti-lock device starts to operate, an additional force is applied to the pusher 25 in the same direction as the spring 7, opposing the closing of the shutter 17. The corrector therefore continues to operate conventionally, but its cut-off point is changed as a function of the pressure of the fluid applied to the end of the pusher 25.

Advantageously, this pressure is a simple continuous function of the pressure prevailing in the corresponding working chamber of the master cylinder. Thus, by careful choice of the cross-sections of the bores, especially of the bore 51, surges and sudden increases of pressure in the brakes when the anti-lock device is activated can thus be avoided, while at the same time continuing to profit from the advantages of the series connection of a corrector in the circuit of the rear-wheel brakes.

Of course, as can be seen, in the event of a failure of the anti-lock device the corrector operates in exactly the same way as when the anti-lock device is not activated, thus ensuring perfect braking safety.

Although only preferred embodiments of the invention have been described, it is clear that an average person skilled in the art will be able to make many modifications, without departing from the scope of the invention, as defined by the accompanying claims.

What we claim is:

1. A hydraulically controlled brake system for a motor vehicle, comprising a master cylinder, a corrector for continuous operation that reduces fluid pressure communicated to rear-wheel brakes in relation to fluid pressure communicated to front-wheel brakes, and a wheel anti-lock device comprising a source of fluid under high pressure, said corrector having a controlled shift of a cut-off point, during operation of the anti-lock device the cut-off point having a specific value higher than a lower cut-off point of the corrector when installed on a vehicle without an anti-lock device, the cut-off point being equal to the lower value in the event of a failure of the anti-lock device.

2. The brake system according to claim 1, wherein the shift is controlled electrically.

3. The brake system according to claim 2, wherein, during the operation of the anti-lock device, the cut-off point is approximately that required when the vehicle is under full load.

4. The brake system according to claim 3, wherein, during normal nonanti-lock operation of the system, the cut-off point is approximately that required when the vehicle is under full load.

5. The brake system according to claim 3, wherein the corrector comprises a body having a stepped bore in which slides a stepped piston carrying a shutter seat controlling communication between an inlet and an outlet of said corrector, a pusher whose position determines the cut-off point of said corrector, a first spring arranged in a first variable-volume chamber and opposing closing of said shutter seat under the effect of pressure at the inlet of the corrector, and a second spring having a prestress different from that of said first spring and being arranged in a second variable-volume chamber in series with said first variable-volume chamber, the chamber enclosing the spring of lower prestress being connected to a reservoir of fluid under low pressure by means of a solenoid valve to provide a hydraulic wall when a shutter seat of said solenoid valve is closed, the chambers being isolated from one another.

6. The brake system according to claim 1, wherein the corrector comprises a body having a stepped bore in which slides a stepped piston carrying a shutter sat controlling communication between an inlet and an outlet of said corrector, a pusher whose position determines the cut-off point of said corrector, a spring arranged in a variable-volume chamber and opposing closing of said shutter seat under the effect of pressure at the inlet of the corrector, the position of said pusher being controlled by electromagnetic means, and said pusher carrying means for opening said shutter seat.

7. The brake system according to claim 6, wherein said bore is closed by closing means whose position determines a specific prestress of said spring.

8. The brake system according to claim 7, wherein the closing means is a threaded plug interacting with an internal thread made in an end of said bore.

9. The brake system according to claim 1, wherein the shift is controlled hydraulically.

10. The brake system according to claim 9, wherein the corrector comprises a body having a stepped bore in which slides a stepped piston carrying a shutter seat controlling communication between an inlet and an outlet of said corrector, a pusher whose position determines the cut-off point of said corrector, and a spring arranged in a variable-volume chamber and opposing closing of said shutter seat under the effect of pressure at the inlet of said corrector, the fluid under high pressure of said anti-lock device being applied simultaneously to said pusher and to said inlet of said corrector so as to exert a force in the same direction as the spring in order to oppose the closing of the shutter seat.

11. The brake system according to claim 10, wherein said bore is closed by closing means whose position determines a specific prestress of said spring.

12. The brake system according to claim 11, wherein said closing means is a threaded plug interacting with an internal thread made in an end of said bore.

* * * * *